United States Patent [19]
Fauteux et al.

[11] Patent Number: 5,531,871
[45] Date of Patent: Jul. 2, 1996

[54] MOLECULAR COMPLEXES FOR USE AS ELECTROLYTE COMPONENTS

[75] Inventors: Denis G. Fauteux, Acton; Martin van Buren, Chelmsford; John Powell, Burlington, all of Mass.

[73] Assignee: Arthur D. Little, Inc., Cambridge, Mass.

[21] Appl. No.: 429,717

[22] Filed: Apr. 27, 1995

Related U.S. Application Data

[62] Division of Ser. No. 268,229, Jun. 29, 1994.

[51] Int. Cl.⁶ .................................................. B01D 61/42
[52] U.S. Cl. ........................ 205/688; 429/188; 204/550
[58] Field of Search ......................... 204/180.1; 429/188

[56] References Cited

PUBLICATIONS

Article entitled "The Molecular Necklace": a rotaxane containing many threaded a–cyclodextrine, Harada et al., Nature 356,325 (Mar. 26, 1992).
Article entitled "Synthesis of a Tubular Polymer for Threaded Cyclodextrins": Harada et al., Nature 364, 516 (Aug., 1993).
Article entitled "How To Make a Molecular Shuttle": David Bradley, New Scientist, p. 20 (Jul. 27, 1991).
Article entitled "Towards a Molecular Abacus": Reddington, M. V. et al., J. Chem. Soc., Chem. Commun., 1991, 9, 630 (no month provided).
"Molecular Shuttle: Prototype for Molecular Machine" S. Borman *C & EN*, Jul. 1, 1991 pp. 4–5.
"A Light–Induced Molecular Shuttle Based on a [2]Rotaxane–Derived Triad" A. Benniston and A. Harriman *Angew. Chem. Int. Ed.* 32(10), 1459 (1993) no month provided.
"The Molecular Necklace: a rotaxane containing many threaded α–cyclodextrins" Harada et al. *Nature* 356, 325 (Mar. 26, 1992).
"Synthesis of a tubular polymer from threaded cyclodextrins" Harada et al. *Nature* 364, 516 (Aug. 1993).

"Molecular Nanotube Aggregates of β– and γ–Cyclodextrins Linked by Diphenylhexatrienes" G. Li and L. B. McGown *Science* 264, 249 (Apr. 8, 1994).
"A chemically and electrochemically switchable molecular shuttle" Bissell et al. *Nature* 369, 133 (May 12, 1994).
"Chemists create molecular 'necklace'" *New Scientist*, p. 43 (Jun. 16, 1988).

(List continued on next page.)

*Primary Examiner*—Arun S. Phasge
*Attorney, Agent, or Firm*—Dick and Harris

[57] ABSTRACT

An molecular complex is provided which includes a linear polymer associated with a cyclic molecule to form a rotaxane of the general formula,

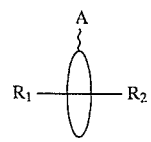

where $R_1$ and $R_2$ are blocking end groups of size and character sufficient to prevent dethreading of the rotaxane and said $R_1$ and $R_2$ the same or different;

where the cyclic molecule comprises a cyclic skeleton and at least one A functional group, said functional group attached to the cyclic skeleton;

where A is selected from the group consisting of polymerizable functional groups, cation complexing groups, anion complexing groups and ionic species; and wherein at least one of $R_1$, $R_2$ and A are selected from the group consisting of cation complexing groups, anion complexing groups and ionic species.

The molecular complex may used in an electrolyte.

2 Claims, 3 Drawing Sheets

OTHER PUBLICATIONS

"How to make a molecular shuttle" David Bradley *New Scientist,* p. 20 (Jul. 27, 1991).

"Transition Metal Templated Formulation of [2]– and [3]–Rotaxanes with Porphyrins as Stoppers" Chambron et al. *J. Am. Chem. Soc.* 1993 (115), 12378–12384 (1993) no month provided.

"Preparation and Characterization of Polyrotaxanes Containing Many Threaded α–Cyclodextrins" Harada et al. *J. Org. Chem.* 1993 (58), 7524–7528 (1993) no month provided.

"Towards Controllable Molecular Shuttles–3" Ashton et al. *Synlett* 923–926 (Nov., 1992).

"Self–Assembly of a Threaded Molecular Loop" Tata Venkata S. Rao and David S. Lawrence *J. Am. Chem. Soc.* 1990 (112), 3614–3615 (1990) no month provided.

"A Molecular Shuttle" Anelli et al. *J. Am. Chem. Soc.* 1991 (113), 5131–5133 (1991) no month provided.

"Making molecules to order" Fraser Stoddart *Chemistry in Britain* 1991, 714–718 (Aug., 1991).

"Molecular Meccano. 1. [2]Rotazanes and a [2]Catenane Made to Order" Pier Lucio Anelli, et al. *J. Am. Chem. Soc.* 1992 (114), 193–218 (1992) no month provided.

"Towards a Molecular Abacus" Reddington et al. *Chemtacts–Organic Chemistry* 4, 350–354 (1991) no month provided.

"Cyclodextrins, Off–the –Shelf Components for the Construction of Mechanically Interlocked Molecular Systems" J. Fraser Stoddart *Angew. Chem. Int. Ed. Engl.* 31(7), 846–848 (1992) (no month provided).

MOLECULAR COMPLEXES FOR USE AS ELECTROLYTE COMPONENTS

This application is a division of application Ser. No. 08/268,229, filed Jun. 29, 1994, pending.

This invention relates to electrolytes and/or electrolyte additives for electrolytic cells and electrochemical devices, such as batteries, capacitors, fuel cells and displays, prepared therefrom.

BACKGROUND OF THE INVENTION

The electrochemical art desires to improve the operating characteristics of electrolytes used in electrochemical devices. In devices such as batteries, capacitors and displays, these electrolytes additionally must be highly conductive in order to allow useful current flux during use. In addition, the electrolyte must be chemically and electrochemically stable towards both cathode and anode materials.

When a potential is applied across an electrolytic cell containing a conventional electrolyte, the cations and anions migrate to the negative and positive electrodes, respectively, thereby forming a charge gradient in the electrolyte. This effect is particularly pronounced in solid polymer electrolyte (SPE) materials which, due to the rigid macromolecular structure of the electrolyte, has considerably reduced cationic mobility and reduced overall ionic mobility. Attempts have been made to prepare a solid polymer electrolyte in which only one of the charged species has mobility by fixing the anions to the polymeric chain so that only the cations are mobile. While immobilizing the anion on the polymer electrolyte chain has the effect of preventing migration during use, it has the additional undesirable effect of reducing cation mobility (and hence conductivity) because of the high affinity of the cation to the immobilized anion. Thus, it is desirable to improve the operating characteristics of electrolytes and to overcome these and other operational limitations inherent in electrochemical devices. One way of overcoming the limitations of the materials currently used in the electrochemical art is to develop and investigate new materials for their potential application in electrochemical cells.

Interlocking molecular systems which self-assemble have been the object of much recent interest and investigation; however, they have not been examined for use in electrochemical cells. Interlocking molecular systems include rotaxane complexes formed by noncovalent interactions between a linear molecule and a cyclic molecule which results in the "threading" of the cyclic molecule or "bead" onto the linear molecule "string". Sterically large terminal groups on the linear molecular string prevent the decomplexation or "de-threading" of the cyclic molecular "beads". Recently, the synthesis and characterization of self-assembling "rotaxanes" have been reported. The interested reader is directed to Stoddart ("Making Molecules to Order" Chemistry in Britain, 714–718, Aug., 1991), Stoddart ("Cyclodextrins, Off-the-Shelf Components for the Construction of Mechanically Interlocked Molecular Systems" Angew. Chem. Int. Ed. Eng. 31(7), 846-8, 1992), Rao et al. ("Self-Assembly of a Threaded Molecular Loop" J. Am. Chem. Soc. 112, 3614-5, 1990) and Harada et al. ("Preparation and Characterization of Polyrotaxanes Containing Many Threaded Cyclorotaxanes" J. Org. Chem. 58, 7524-8, 1993) for further information.

Many rotaxane complexes function as "molecular shuttles" by moving back and forth between identical stations along the length of the linear polymer or molecule. Research directed by Stoddart has succeeded in producing a rotaxane complex including a cyclic molecule (made up of two bipyridinium units and two bridging p-xylyl spacers) which moves back and forth between aromatic sites on a linear polyether string (See, "Molecular Shuttle: Prototype for molecular machine" C&EN, 4–5 (Jul. 1, 1991)). The shuttle may be activated by chemical and electrochemical triggers (See, "A Chemically and Electrochemically Switchable Molecular Shuttle" Nature 369, 133–7 (May 12, 1994)); however, a practical application for such molecules has yet to be proposed.

While these interlocking molecular systems have generated much excitement in the scientific community because of their ability to self-assemble and self-replicate at a molecular level, practical applications utilizing these self-assembling complexes have not been rapidly forthcoming.

It is the object of the present invention to provide a molecular complex which can be used in an electrolyte. It is a further object of the invention to provide a molecular complex which exhibits improved conductivity and ion transport. It is a further object of the present invention to provide an electrolyte exhibiting improved conductivity and ion transport. It is yet a further object of the present invention to provide a precursor which improves the control of the nature of the interface between the electrode surface and the solution. It is yet a further object of the present invention to utilize rotaxane complexes in electrochemical and electrolytic devices.

SUMMARY OF THE INVENTION

The present invention overcomes the above-stated of the electrolytes of the electrochemical art by the use of novel molecular complexes in electrolyte compositions. In one aspect of the invention, an electrolyte composition includes a linear polymer associated with a cyclic molecule to form a rotaxane of the general formula, where $R_1$ and $R_2$ are blocking end groups of size and character sufficient to prevent dethreading of the rotaxane and which are the same or different;

where the cyclic molecule comprises a cyclic skeleton and at least one A functional group, said functional group attached to the cyclic skeleton; and where A is selected from the group consisting of polymerizable functional groups, cation complexing groups, anion complexing groups and ionic species.; and wherein at least one of $R_1$, $R_2$ and A are selected from the group consisting of cation complexing groups, anion complexing groups and ionic species.

By "blocking end groups", as that term is used herein, it is meant to include terminal substituents on the linear molecule which are of a size and a character sufficient to prevent dethreading of the rotaxane. Dethreading of the rotaxane occurs when the cyclic molecule decomplexes from the linear molecule. The blocking end groups may be of a steric size which prevents the cyclic molecule from moving past the blocking end group and, thereby, dethreading. Alternatively, the blocking end group may be of a character which discourages the approach of the cyclic end group to the blocking end group and thereby prevents dethreading, for example, when there exists a repulsive interaction between the blocking end groups and the cyclic molecule.

In preferred embodiments, at least one of $R_1$ and $R_2$ may be block and graft copolymer blocking end groups. The blocking end groups additionally may be a polymerizable functionality, an ionic functionality, a cation complexing functionality or an anion complexing functionality. The blocking end group may be a blocking end group sensitive to alignment in an electric field or to alignment based on hydrophobic-hydrophilic interactions. In other preferred embodiments, the A functional group may be attached to the cyclic skeleton of the cyclic molecule through a linear oligomer with one to 20 repeating units. At least two A functional groups may be attached to the cyclic skeleton of the cyclic molecule. The two or more A functional groups may be the same or different. In another preferred embodiment, the molecular complex may include a plurality of cyclic molecules on a single linear molecule.

In yet another preferred embodiment, $R_1$ and $R_2$ are blocking end groups selected from the group consisting of cation complexing groups, anion complexing groups and ionic species and A includes a polymerizable functional group. A polymerized molecular complex may be obtained by reacting at A to link adjacent cyclic molecules.

In yet another preferred embodiment, $R_1$ and $R_2$ are polymerizable blocking end groups and A is a cation complexing group, anion complexing group and ionic species. A polymerized molecular complex may be obtained by reacting at $R_1$ and $R_2$ to link adjacent linear molecules.

In another aspect of the present invention, a method of transporting an ion within an electrolyte composition including a molecular complex comprising a linear molecule associated with a cyclic molecule is provided. The cyclic molecule includes a functional group attached thereto, which is capable of interacting with an ion. The cyclic molecule is located between a pair of blocking groups of the linear molecule and is capable of motion along the length of the linear molecule between the blocking groups. An ion is introduced into the electrolyte composition and a voltage is applied across the electrolyte composition. The ion migrates, whereby the functional group interacting with the ion moves along the length of the linear molecule in the same direction as the ion and transfers the ion to a functional group of an adjacent cyclic molecule.

In yet another aspect of the invention, a method of transporting an ion within an electrolyte composition including a molecular complex comprising a linear molecule associated with a cyclic molecule is provided, in which the cyclic molecule having limited mobility in the electrolyte composition. The cyclic molecule is located between a pair of blocking groups of the linear molecule, and the blocking groups are capable of interacting with an ion. The linear molecule is capable of motion along the length of the linear molecule between the blocking groups. An ion is introduced into the electrolyte composition and a voltage is applied across the electrolyte composition. The ion migrates, whereby the functional group interacting with the ion moves along the length of the linear molecule in the same direction as the ion and transfers the ion to a functional group of an adjacent linear molecule.

The molecular complex of the present invention provides an electrolyte component of high conductivity and ion mobility.

BRIEF DESCRIPTION OF THE DRAWING

The novel features of the invention both as to its structure and operation is best understood from the accompanying drawings, taken in conjunction with the accompanying description, in which similar reference characters refer to similar elements, and in which:

FIG. 3 illustrates (a) alignment substantially along the axis of the linear molecule; and (b) stacking alignment of the molecular complexes of the present invention;

FIGS. 4(a–c) are a schematic illustration of ion transport by the electrolyte of the present invention.

DESCRIPTION OF THE PREFERRED EMBODIMENT

The present invention provides a novel molecular complex for use in an electrolyte for electrolytic cells and electrochemical devices. The molecular complex includes a linear molecule associated with a cyclic molecule to form a rotaxane. The rotaxanes of the present invention are functionalized to impart properties required of an electrolytic cell, such as high ionic conductivity, high transport number, electrochemical stability and reduced crystallinity. A novel aspect of the present invention is the introduction of a ion complexing or ionic group onto the molecular complex, which is capable of interacting with ions in the electrolyte.

The molecular complex of the present invention has the general formula, where $R_1$ and $R_2$ are blocking end groups of size and character sufficient to prevent dethreading of the rotaxane and which are the same or different;

where the cyclic molecule comprises a cyclic skeleton and at least one A functional group, said functional group attached to the cyclic skeleton; and where A is selected from the group consisting of polymerizable functional groups, cation complexing groups, anion complexing groups and ionic species.

Figure 1:
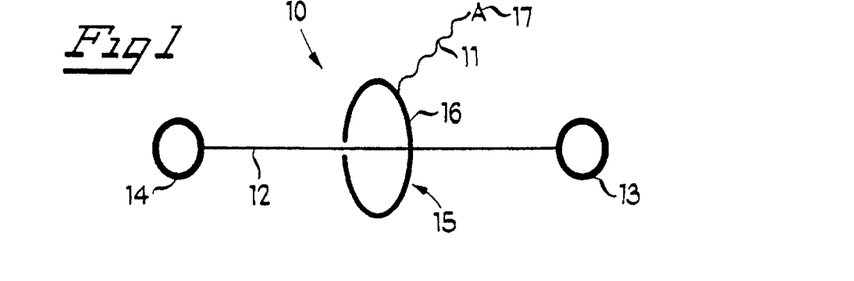
FIG. 1 illustrates an embodiment of the molecular complex of the present invention.

With reference to FIG. 1, a molecular complex 10 is shown including a linear molecule 12 having blocking end groups 13 and 14. Blocking end groups 13 and 14 may be the same or different. A cyclic molecule 15 is "threaded" onto the linear molecule 12. The cyclic molecule 15 includes a cyclic skeleton 16, and at least one functional group 17 (A) which is attached to the cyclic skeleton. A novel aspect of the present invention is that at least one of 17 (A), 13 ($R_1$) and 14 ($R_2$) is an ionic species capable of complexing or interacting with an ion.

If the linear molecule 12 is to interact favorably with the cyclic molecule 15, the linear molecule should be of a size less than the size of the internal cavity of the cyclic molecule. The internal cavity size may differ greatly among various cyclic molecules. For example, cyclodextrins contain cylindrical cavities about 0.7 nm deep and 0.45 nm, 0.7 nm and 0.75 nm for α-, β- and γ-cyclodextrin, respectively. "Size" is determined by the space occupied by the group including any normal configuration changes which the linear molecule undergoes in solution.

Since the linear molecule must be of considerable length, it is typically, but not necessarily, an oligomer or a polymer. The linear molecule typically has a molecular weight ($M_w$) of greater than 200. Exemplary of suitable linear oligomers and polymers include, but are in no way limited to, polypropylene (PP), polyethylene (PE), polyester, polyethylene oxide (PEO), polypropylene oxide (PPO) and polyethyleneimine (PEI). In molecular complexes of the present invention, oligomers and polymers of polyethylene oxide are particularly preferred because such macromolecules have been used successfully in electrolytic cells, can be easily manufactured to any desired length and can form rotaxanes with a variety of cyclic molecules, most notably cyclodextrin.

The linear molecule 12 of the molecular complex 10 terminates with blocking end groups 13 and 14 of size and character sufficient to prevent dethreading of the rotaxane. A "sufficient" size is a function of the size of the internal cavity of the cyclic molecule which is used in the formation of the rotaxane. The blocking end group should be large enough to prevent the cyclic molecule from "sliding" over the bulky end group and decomplexing the rotaxane. The blocking end group may alternatively or additionally be of a character that prevents decomplexation of the rotaxane. In particular, the blocking end group may interact repulsively with the cyclic molecule and thereby hinder its approach to the end group and the subsequent decomplexation of the rotaxane. An example of a repulsive interaction is where both the blocking end group and the cyclic molecule are similarly charged. The blocking end groups having sufficient character and size for the cyclic molecules contemplated in this invention include by way of example, but are in no way limited to, 2-4-dinitrophenyl-, trialklysilyl-, trialklymethyl-, 4-tritylphenyl ether and triphenyl methyl-groups.

The blocking end group of sufficient size and character may be a macromolecule, derived from a block or graft copolymer. By "macromolecular graft or block", as that term is used herein, it is meant a macromolecular subcomponent of block or graft copolymers. Graft or block copolymers contain long sequences of two or more different monomers. The macromolecular graft or block may be linear or branched, however, they must be of sufficient size or character to prevent dethreading. The macromolecular graft or block is typically a block or graft onto the linear molecule of the rotaxane which is itself an oligomer or a polymer. Use of block copolymers permit the assembly of the rotaxane along a portion of the polymer which is susceptible to rotaxane formation (appropriate size and character, favorable interactions between the linear cyclic molecules, etc), followed by the addition of a bulky monomer to form a copolymer block which functions as the blocking end group. Suitable graft and block macromolecules include but are in no way limited to polyphosphazene, polydimethylsiloxane and polypropylene oxide.

Bulky end groups may be selected to possess additional desirable functionalities. Bulky end groups may be a polymerizable functionality, an ionic functionality, a cation complexing functionality or an anion complexing functionality.

"Polymerizable functional groups" are capable of chain extension reactions or cross-linking reactions to obtain structures of higher molecular weight. Conventional functional groups may include, by way of example and in no way limited to, pisoprenylstyrene, substituted divinylbenzene, isocyanate and imine derivatives. Polymerization can be accomplished using any conventional method including photoinitiation, free radical polymerization, chemical initiation. It is contemplated that the molecular complex may be polymerized with a comonomer to form a copolymer or with itself to form a homopolymer. The comonomer may be any small organic molecule capable of reacting with the polymerizable functional group including, by way of example only, styrene, and acrylate and methacrylate derivatives.

Figure 2:
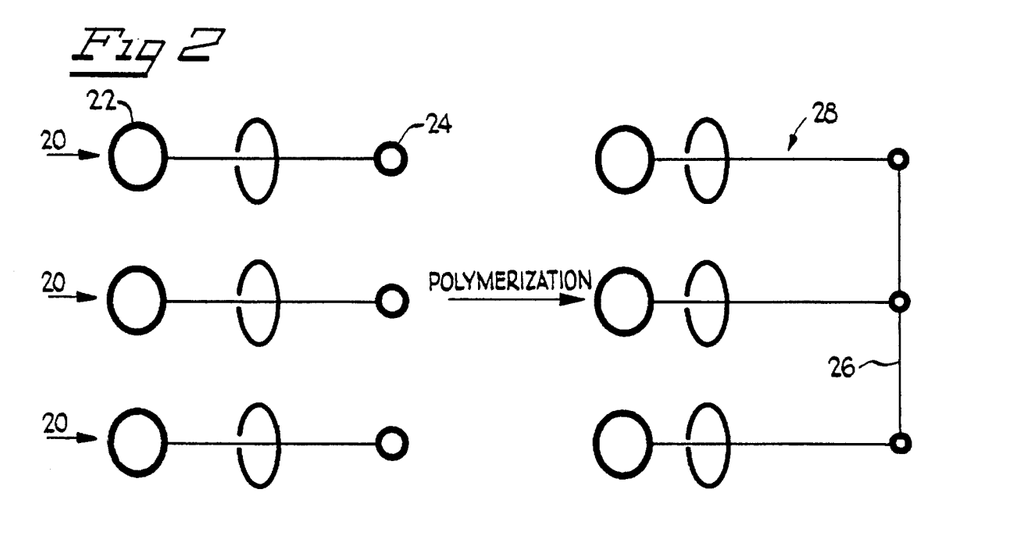
FIG. 2 illustrates an embodiment of the molecular complex of the present invention showing linkage at the linear molecule.

The requirement that the bulky end group be of a size and character to prevent dethreading of the rotaxane may be met by the polymerizable functional group in the polymerized state, rather than in the unreacted state. Since the blocking end group increases in size upon polymerization, the actual functional group of the molecular complex may be of insufficient size, which becomes sufficient upon polymerization. In one embodiment of the present invention, a series of rotaxanes 20 includes a conventional blocking end group 22 and a rather small polymerizable blocking end group 24, i.e., a maleate. The maleic groups then can be polymerized to form a polyester backbone 26, thereby forming a network rotaxane 28. The polyester backbone 26 effectively serves as the blocking end group. FIG. 2 illustrates this embodiment of the present invention.

"Cation complexing functionalities", "anion complexing functionalities" and "ionic functionalities" include charged and neutral species which can complex or interact with ions in the electrolyte. Cation complexing functionalities include, by way of example and in no way limited to, crown ethers, thio-crown ethers and AZA crowns. Anion complexing functionalities include, by way of example and in no way limited to, borates and organometallic species. Ionic functionalities include, by way of example and in no way limited to, sulfonates, phthlates, carboxylates and ammoniums. In molecular complexes of the present invention, which are capable of interacting with small alkaline earth and alkali metal cations, such as $Li^+$, $Na^+$ and proton ($H^+$), are particularly preferred. By "interaction", as contemplated by the present invention, that term is meant to include interactions that are electrostatic, bases upon ion complexation interactions or charge attraction.

The cyclic molecule 15 includes a cyclic skeleton 16 which can interact favorably with the linear molecule 12 and is capable of bearing pendant A functional groups 17. In particular, it may be α-, β-, or γ-cyclodextrin; it may alternatively be a cyclic ether such as a crown ether. The cyclic molecule further may include ring systems including aromatic phenyl and pyridinium units, such as cyclobis(paraquat-p-phenylene). A novel aspect of the present invention is the substitution of a functional end group A onto the cyclic skeleton of the cyclic molecule. A may be selected from the group consisting of polymerizable functional groups, ionic species, cation complexing groups and anion complexing groups. The suitable chemical moieties for use as A are similar to those used for $R_1$ and $R_2$ in that they are selected to perform the similar functions. "Polymerizable functional groups" are capable of chain extension reactions or cross-linking reactions to obtain structures of higher molecular weight. "Cation complexing groups", "anion complexing groups" and "ionic species" include charged and neutral species which can complex or interact with oppositely charged ions in the electrolyte. A functional end groups differ from the $R_1$ and $R_2$ blocking end groups in one important way. There is no requirement that A have a size or character sufficient to prevent dethreading of the rotaxane, since A or the oligomeric pendant groups which may attach A to the cyclic skeleton do not serve to form rotaxanes. Rather, the functional group A is selected to have the desired functional properties without regard to size.

The functional end group A optionally may be attached to the cyclic skeleton through a linear oligomer 11 comprised of between one to twenty repeating units. Suitable oligomers include, but are in no way limited to, polypropylene, polyethylene, polyester, polyethylene and polypropylene oxide, polyphosphazene and polysiloxane.

There is at least one A functional end group attached to the cyclic skeleton of the cyclic molecule. In one embodiment of the present invention, there may be two or more A functional end groups, which may be the same or different, attached to the cyclic molecule. The upper limit to the number of A groups attached to the cyclic skeleton is based on the number of reactive sites originally on the cyclic molecule which can be substituted for the functional end groups A of the present invention. For example, α-cyclodextrin, which is made up of six glucose molecules and contains three active hydroxyl groups per glucose molecule, has 18 potential sites on its cyclic skeleton for potential substitution of the functional groups A of the present invention. Several of the active sites however, may be sterically inaccessible and the number of sites that can be practically substituted is considerably less. Further, the number of sites that it is desirable to substitute in order to impart desirable properties to the electrolyte composition may be considerably less and is preferably in the range of one to six.

It is within the scope of the present invention to thread a plurality of cyclic molecules onto the linear molecule. The actual number of cyclic molecules is limited by the number of available sites along the length of the linear molecule for interaction of the cyclic molecule. Harada et al. (J. Org. Chem. 58, 7524–28 (1993)) have reported threading as many as 20 α-cyclodextrins on a polyethylene glycol chain of average molecular weight of 2000. The optimal number of cyclic molecules per rotaxane is that which best facilitates ion transport with the electrolyte. One of ordinary skill can determine the optimum number of cyclic molecules per rotaxane by measuring the transport number of the molecular complex. Appropriate measurements to determine transport number which are common to the electrochemical art will be readily apparent and known to those art-skilled practitioners, for example, by use of Hitthors Method.

It is further within the scope of the invention to substitute the cyclic molecule with additional groups which do not immediately serve in ion transport or polymerization. The purpose of such additional groups on the cyclic molecule may serve a variety of purposes, including, but not limited to, to deactivate electrochemically unstable species which may react with other components of the electrolyte or to serve as a plasticizer in the electrolyte reducing crystallinity and promoting conductivity of the electrolyte. For example, chemical moieties without active hydrogen are particularly desirable when the electrolyte is intended for use in a non-aqueous electrolyte-based system. Cyclodextrin, which contains reactive hydroxyl groups, preferably is reacted to inactivate those sites, for example, by reaction with an alcohol to form an alkyl ether.

Figure 3A:
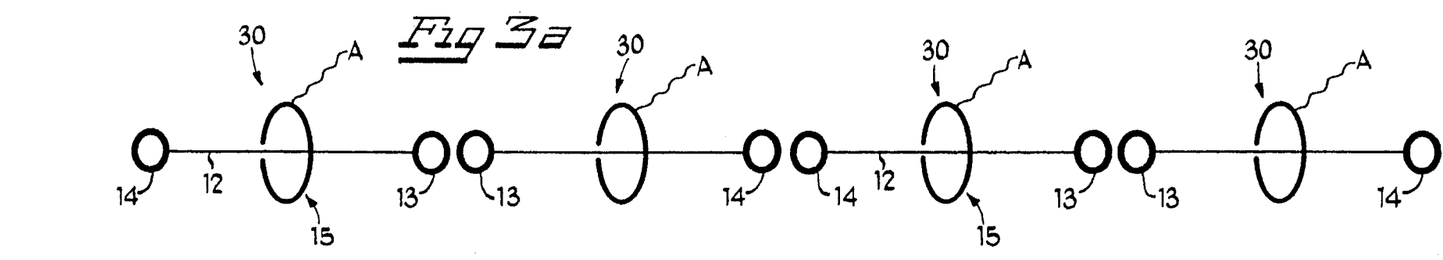
Figure 3B:
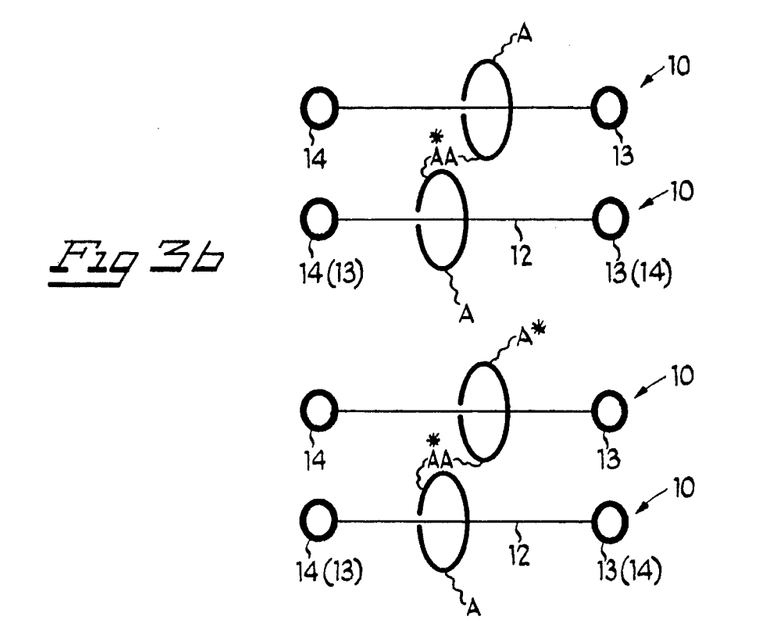

Within the electrolyte, the molecular complex may be aligned, either "end-to-end" so that blocking end groups from neighboring molecular complexes approach one another (see, FIG. 3(a)) or "stacked" so that each molecular complex substantially is aligned with a neighboring molecular complex and the respective functional groups A of the cyclic molecule are in closest contact (see, FIG. 3(b)). It is possible that both alignments may exist in the electrolyte. It is recognized that the molecular complexes of the present invention may be fairly large and that the actual configuration of the molecular complex in solution may be more complex than that shown in FIG. 3. "Alignment", as that term is used herein, is meant to indicate a higher degree of order in a particular direction as compared with a random orientation.

With reference to FIG. 3(a), molecular complexes 30 are shown. In this particular embodiment, blocking end group 13 may be a group which is different from the blocking end group 14. In this manner, the molecular complex is aligned end-to-end. Such alignment may be promoted by appropriate selection of blocking end groups. For example, the blocking end groups may be charged ionic functional groups which are sensitive to alignment in an electric field. Alternatively, $R_1$ blocking end groups 13 may be substantially hydrophobic (a hydrophobic head), while $R_2$ blocking end groups 14 may be polar or charged (a polar tail). The $R_1$ end groups 13 will interact preferably and the $R_2$ end groups 14 will interact preferably, resulting in the head-to-head and tail-to-tail alignment observed with surfactants. Molecular complexes may be stacked by similar selection of A and A* functional end groups, as shown in FIG. 3(b), where A and A* may be the same or different.

An electrolyte containing the molecular complex of the present invention may exhibit high ionic conductivity and is capable of promoting ion transport within the electrolyte without significant formation of an ionic gradient. Lithium cation, $Li^+$, is a preferred ion. The advantages of the electrolyte composition in promoting ionic transport are illustrated with reference to FIG. 4. Molecular complexes 40 and 41 each include a functional end group A which is a negatively charged species, here designated as $A^-$. A positively charged cation $M^+$ is associated with $A^-$. The linear molecule 12 includes sites along its length which interact with the cyclic molecule 15 and the cyclic molecule 12 is capable of motion along the length of linear molecule 12 in the directions indicated by arrows 43 and 44. In the present embodiment, the ion complexing or interacting group is the group A of the cyclic molecule.

Figure 4A:
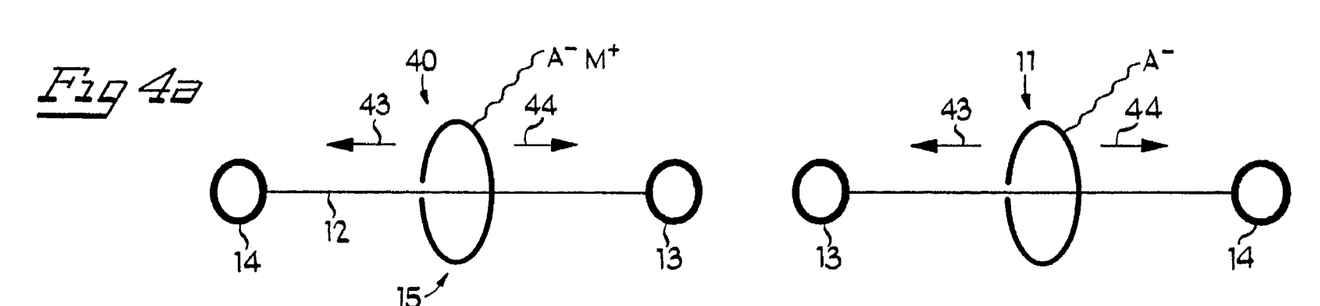
Figure 4B:
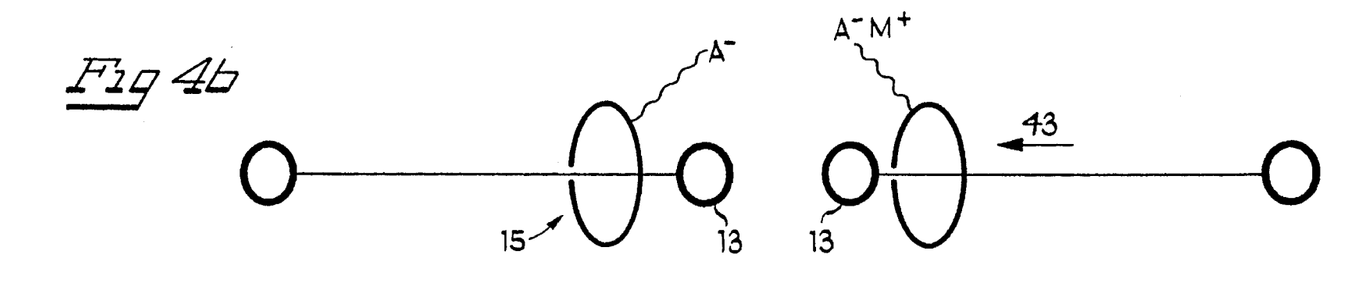
Figure 4C:
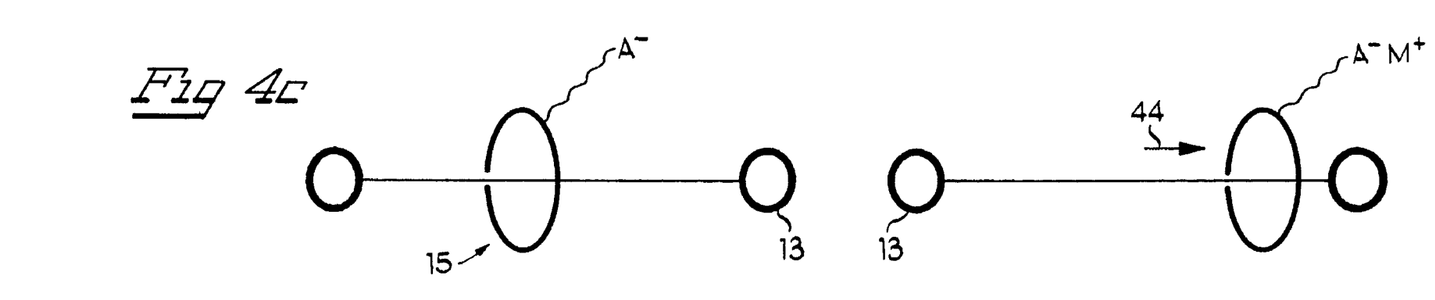

In operation, the electrolyte including the molecular complexes 40 and 41 shown in FIG. 4(a) is disposed between a cathode and an anode (not shown) to form an electrolytic cell and a voltage is applied forcing ionic flux across the cell. Suitable voltage is obtained by discharging the cell, using the electrochemical potential of the cell to induce ionic flux, or by applying a potential across the cell. The free cation $M^+$ migrates in the direction of the oppositely charged electrode (the cathode). The pendant group $A^-$ is strongly associated with $M^+$ and is drawn with $M^+$ towards the cathode along the length of the linear molecule 12, which is assumed for the purposes of this explanation to be in the direction indicated by arrow 44. Further movement of the cyclic molecule 15 on linear molecule 12 is prevented by the blocking end group 13. However, the proximity of $M^+$ to molecular complex 41 attracts the cyclic molecule 15 on molecular complex 21 to migrate in the direction indicated by arrow 43 and to approach $M^+$. $M^+$ then moves from its site on molecular complex 40 to 41 and proceeds to move in the direction indicated by arrow 44 in the direction of the cathode (see, FIG. 4(c)). In this way, $M^+$ is transported within the electrolyte from one molecular complex to a neighboring molecular complex. Because $M^+$ is passed from one anionic species to the next, no charge gradient develops in the electrolyte. Further, because the functional end group A on the cyclic molecule of the molecular complex is inherently capable of a wide degree of movement (i.e., axial and radial motion), it is capable of traveling with the free ion for short distances and thereby overcoming the disadvantages of immobilized ions which have high affinity for the free ion. Freedom of movement may be even further enhanced by use of a linear oligomer to attach the A functional end group onto the cyclic skeleton.

Figure 5:
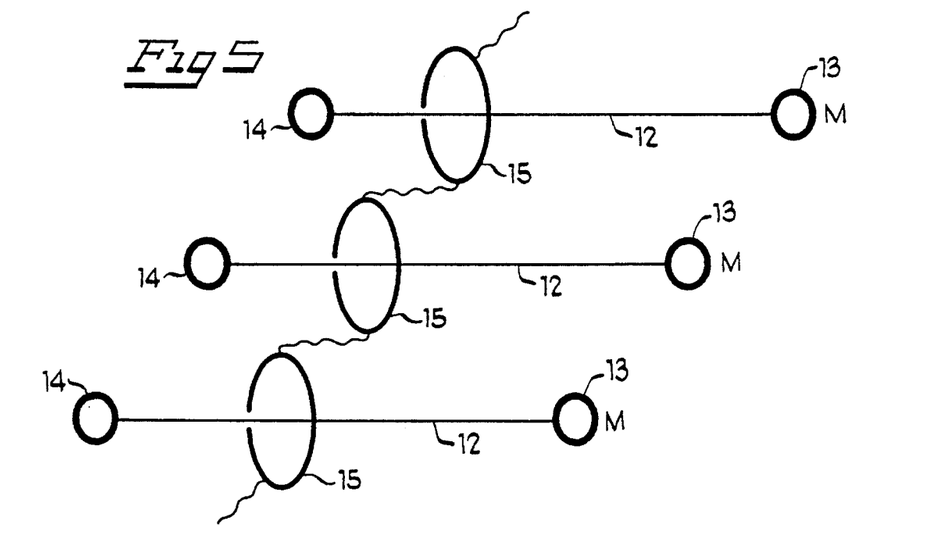
FIG. 5 illustrates an embodiment of the molecular complex of the present invention showing linkage of cyclic molecules.

In yet another embodiment of the molecular complex of the present invention, the molecular complex includes at least two polymerizable functional end groups. A plurality of such individual molecular complexes are polymerized through these polymerizable functional end groups to form a polymerized molecular complex, as depicted in FIG. 5. In this embodiment, blocking end groups 13 and 14 are cation complexing, anion complexing or ionic blocking end groups which are capable of associating with an ion, here designated as M. The polymerized cyclic molecules serve to anchor the network molecular complex, while the linear molecule is able to shuttle back and forth. The linear molecule has only limited mobility, however, as it can only shuttle back and forth between its respective blocking end groups. As discussed above, these network molecular complexes can effectively transport ions through the electrolyte, using the same shuttling motion as described for FIG. 4(a)–(c). As the blocking end group 13 approaches a neighboring blocking end group, the ion associated with it can transfer to the neighbor and so on through the electrolyte.

In both of the embodiments presented above, the counterion is anchored by the molecular complex. Its mobility is restricted, but not completely eliminated. This provides versatility to the electrolyte, which can permit some short range migration of the counterion with the mobile ion species, but not to the extent that an undesirable ionic charge gradient develops in the electrolyte. Therefore, the electrolyte will exhibit superior ion transport capabilities.

An electrolyte using the molecular complex of the present invention may additionally include conventional component used in electrolytes. For example, the electrolyte may additionally include solvents, plasticizers and electrolyte salts.

"Solvents" as used herein include compounds capable of solubilizing either or both the molecular complex and the ion to be transported. In some cases, addition of a solvent will result in a liquid electrolyte where the molecular complex is completely solubilized or a gel electrolyte, where the solvent interacts, but does not completely solubilize the complex. "Plasticizers" as that term is used herein includes a non-reactive compound which reduces the crystallinity of the electrolyte. Suitable plasticizers include, but are in no way limited to, trialkylsilanes, alkanes, phosphate esters, phosphinate esters, and saturated organic esters. These plasticizers may also be used as electrolyte solvents. By "electrolyte salts," as that term is used herein, it is meant a salt which is soluble in the electrolyte which provides the ion to be transported. Suitable electrolyte salts include, but are in no way limited to, salts of an alkoxide, an alkyl or haloalkylcarboxylate or sulfonate.

Examples

Example 1: Preparation of an ionically modified α-cyclodextrin: This example shows the synthesis of a cyclic molecule (cyclodextrin), in which the functional group A is an ionic group, sodium sulfopropyl.

In a typical example, α-cyclodextrin (0.01 mole, 9.73 g. American Maize Products Co.) is dissolved in dimethyl sulfoxide (DMSO, 75 ml, Aldrich Chemical CO.), and the resulting solution dried over 4Å molecular sieves (Davison Chemical Co.). The solution is transferred to a clean dry flask. 1,3-propane sulfone (1.34 g., 0.011 mole, Aldrich Chemical Co.) is added to the α-cyclodextrin solution, and the flask's contents are briefly mixed.

Sodium hydride (0.26 g, 0.011 mole, Aldrich Chemical Co.) and DMSO (20 ml) are charged to a 250 ml three neck flask equipped with a stirrer, argon gas feed, thermometer, heating mantle, cylindrical pressure equalizing addition funnel and condenser. The α-cyclodextrin/1,3-propane sultone/DMSO solution is placed in the cylindrical funnel. This is slowly added to the stirred sodium hydride slurry. During the addition vigorous effervescence of hydrogen gas occurs from the reaction, and the temperature of the flask's contents may rise above room temperature. After completion of the addition, the reactants are gently warmed with continuous stirring to about 55° to 70° C. for about 4 hr, and then allowed to cool overnight to room temperature. Gentle heating during the day followed by cooling over night is repeated for the next 4 days. The solution is then filtered and DMSO removed at reduced pressure.

The product is identified as sodium sulfopropyl α-cyclodextrin. Confirmation of the product's identity is made by infrared spectroscopy and thin layer chromatography. The average degree of sulfonation is one; there is no favored site of sulfonation and all sites are expected to be equally substituted. It is expected that yield of sodium sulfopropyl α-cyclodextrin will be in the range of 85%.

Example 2: Preparation of a rotaxane using a block copolymer: This example shows the synthesis of a molecular complex including sodium sulfopropyl α-cyclodextrin as the cyclic molecule, a linear molecule containing a poly(dimethyl siloxane) group as a first blocking end group and methacrylate as a second blocking end group.

Protorotaxane formation: In a typical example, a poly(dimethyl siloxane)poly(ethylene oxide) block copolymer (10.0 g, about 0.01 mole, Huls America) is converted to the primary amine via treatment with $PBr_3$ and ammonia and dissolved in water (50 ml). The approximate composition of the copolymer is $(CH_3)_3SiO(CH_3)_2Si(CH_2)_3(OCH_2CH_2)_{18}NH_2$. The sodium sulfopropyl α-cyclodextrin of Example 1 (16.7 g, 0.015 mole) is added to the aqueous solution, and the solution agitated by ultrasonic energy. After agitation the solution is added dropwise to acetone (500 ml) with vigorous stirring to induce precipitation of the protorotaxane. The precipitate is filtered and dried in vacuum at about 75° C.

End-blocking with a polymerizable blocking group: Methacryloyl chloride (1.5 g, 0.015 mole) is dissolved in DMSO (25 ml). The solution is placed in a flask equipped with a nitrogen gas sparge and a magnetic stirrer. Dried protorotaxane (24 g) is added to the flask and allowed to react with methacryloyl chloride for 24 hours at ambient temperature. The acid chloride predominantly reacts at the primary amine. Solvent is removed under reduced pressure. The product is identified as a molecular complex having a poly(ethylene oxide) linear molecule with a poly(dimethylsiloxane) blocking end group, a methacrylamide blocking end group, and a sodium sulfopropyl α-cyclodextrin cyclic molecule. The structure of the molecular complex product is confirmed by NMR.

Example 3: Polymerization of a molecular complex: This example illustrates the polymerization of a molecular complex through reaction at the blocking end groups of the linear molecule.

In a typical example, the molecular complex of Example 2 (25 g) is dissolved in water (150 ml). The solution is transferred to a 250 ml three neck flask equipped with a stirrer, argon gas feed, thermometer, heating mantle and condenser. The solution warmed to 50° C. with stirring under argon gas. 2,2'-azobis(N,N'-dimethylencisobutyramidine) dihydrochloride (0.05 g, Wako Pure Chemical Industries, Ltd.) is then added to the flask, and the flask's contents is held at 50° C. for 8 hours. During this time the apparent viscosity of the solution increases to a syrup consistency due to as increase in molecular weight. The product is identified as a polymerized molecular complex having a poly(ethylene oxide) linear molecule with a poly(dimethylsiloxane) blocking end group and a polymerized poly(methacrylamide) end group and a sodium sulfopropyl α-cyclodextrin cyclic molecule. Molecular weight determination is carried out by GPC. $M_N$ of about 10,000–20,000 is expected.

Example 4: Preparation of an α-cyclodextrin modified with polymerizable ionic groups: This example shows the synthesis of a cyclic molecule (cyclodextrin), in which the functional group A is both anionic and polymerizable.

In a typical example, α-cyclodextrin (0.05 mole, 48.7 g, American Maize Products Co.) is dissolved in DMSO (250 ml, Aldrich Chemical Co.). The solution is transferred to a clean dry 500 ml three neck flask equipped with stirrer, heating mantle, thermometer, argon gas feed and condenser. Maleic anhydride (14.7 g, 0.015 mole, Aldrich Chemical Co.) and about 0.2 g acid-treated Fuller's earth are added to the α-cyclodextrin solution, and the flask's contents are briefly mixed. The contents of the flask are heated to 70° C. for several hours and then allowed to cool overnight to room temperature. The solution is then filtered and neutralized with lithium hydroxide (Aldrich Chemical Co.). DMSO and trace water are removed at reduced pressure.

The product is identified as lithium maleated α-cyclodextrin. Confirmation is made by infrared spectroscopy and thin layer chromatography. The average degree of maleation is three; however, maleation is expected to occur equally at all available sites. Yield of lithium maleated α-cyclodextrin expected to be in the range of 99%.

Example 5: Preparation of a rotaxane using poly(ethylene oxide): This example shows the synthesis of a molecular complex including the lithium maleated α-cyclodextrin of Example 4 as the cyclic molecule and poly(ethylene oxide) as the linear molecule having phthalate as an ionic blocking end group.

Protorotaxane formation: Poly(ethylene oxide) (20.0 g, about 0.02 mole, Scientific Polymer Products) is dissolved in water (100 ml). The lithium maleated α-cyclodextrin of Example 4 (32.3 g, 0.025 mole) is added to the aqueous solution, and the solution is agitated by ultrasonic energy. After agitation the solution is added dropwise to acetone (500 ml) with vigorous stirring to induce precipitation of the protorotaxane. The precipitate is filtered and dried in vacuum at about 75° C.

End-blocking with an ionic blocking group: Phthalic anhydride (28.4 g, 0.2 mole) is dissolved in DMSO (200 ml). The solution is placed in a flask equipped with a magnetic stirrer. Dried protorotaxane (45 g) is added to the flask and allowed to react with the phthalic arthydride for several hours at 70° C. The solvent and most of the residual phthalic arthydride are removed under reduced pressure. Crude product is taken up in water, neutralized with lithium hydroxide, and washed several times with ethyl ether. The aqueous phase is then dried at 75° C. in an air oven and the solid residue at 75° C. in vacuum. The product is identified as a molecular complex having a poly(ethylene oxide) linear molecule with phthalic anhydride blocking end groups and a lithium maleated α-cyclodextrin cyclic molecule. The structure of the molecular complex product is confirmed by NMR Example 6: Polymerization of a molecular complex: This example shows the polymerization of a molecular complex through reaction at the functional group A of the cyclic molecule.

In a typical example, the molecular complex of Example 5 (25 g) is dissolved in propylene carbonate (25 ml). Styrene (5.0 g, 0.048 mole, Aldrich Chemical Co.) and t-butyl peroctoate (0.05 g, Lucidol) are added to the solution and dissolved. About 0.5 g of the solution is sealed in a 0.001 in thick glass polymerization cell, and the cell placed in an 80° C. circulating air oven for four hours. After cooling to room temperature, a gelled polymer film is removed from the casting cell. The product is identified as a polymerized molecular complex having a poly(ethylene oxide) linear molecule with lithium phthalate ester blocking end groups and a copolymer gel comprised of styrene and lithium maleated α-cyclodextrin. The gel swells but does not dissolve is DMSO.

Example 7: Preparation of an orienting rotaxane: This example illustrates the formation of a molecular complex capable of being aligned in a head-to-tail orientation.

Protorotaxane formation: In a typical example, α-cyclodextrin (19.5 g, 0.02 mole) and triethyl amine (12.2 g, 0.12 mole, Aldrich Chemical Co.) are dissolved in DMSO (50 ml). Trimethylchlorosilane (13.0 g, 0.12 mole, Aldrich Chemical Co.) in DMSO (25 ml) is added to the stirred α-cyclodextrin solution, the solution warmed to about 55° C. for 6 hours, and cooled overnight. Although silylation may occur at any available hydroxyl group, the six primary hydroxyls of the α-cyclodextrin are silylated preferentially. Amine hydrochloride salt is removed from the product solution by filtration, and solvent removed from the product under reduced pressure. The structure of the trimethylsilyl modified α-cyclodextrin is confirmed by infrared spectroscopy. A poly(dimethylsiloxane)-poly(ethylene oxide) block copolymer (10.0 g, about 0.01 mole, Huls America) is dissolved in water (50 ml). The approximate composition of the copolymer is $(CH_3)_3SiO(CH_3)_2Si(CH_2)_3(OCH_2CH_2)_{18}OH$. Trimethylsilyl modified α-cyclodextrin is added to the aqueous solution, and the solution agitated by ultrasonic energy at 30° C. for 60 minutes. After agitation the solution is added dropwise to acetone (500 ml) with vigorous atirring to precipitate the protorotaxane. The precipitate is filtered and dried in vacuum at about 75° C.

End blocking of the rotaxane: Phthalic anhydride (89 g, 0.6 mole), DMSO (250 ml) and about 1 g acid-treated Fuller's earth are added to a clean dry 500 ml three neck flask equipped with stirrer, heating mantle, thermometer, argon gas feed and condenser. The α-cyclodextrin solution and the flask's contents are briefly mixed. The protorotaxane is added to the flask, and the flask's contents are heated to 70° C. for several hours and then allowed to cool overnight to room temperature. The solution is then filtered and neutralized with lithium hydroxide (Aldrich Chemical Co.). DMSO and trace water are removed at reduced pressure.

The molecular complex of this example is structured identically to an ionic surfactant with a hydrophobic tail (the silicone end) and hydrophilic head (the lithium phthalate ethoxylate). In a monolayer film this rotaxane will preferentially orient itself tail to tail and head to head.

Example 8- Preparation of an Electrochemical Cell: This example illustrates the formation of an electrolyte based on a molecular complex. The electrolyte is used in the fabrication of an electrochemical cell.

Electrolyte precursor: An electrolyte precursor is formulated as follows:

30% wt of the ionically modified molecular complex of Example 2

50% wt of a mixture (1:1) of ethylene carbonate and dimethyl carbonate

10% wt of polyethylene glycol diacrylate (comonomer)

9.9% wt of ethoxylated trimethyl propane triacrylate (comonomer)

0.1% of t-butyl peroctoate (thermal initiator)

The electrolyte precursor is prepared by mixing the components to form a solution.

The precursor is stored in a refrigerator until needed for coating.

Cathode precursor: A cathode precursor is formulated as follows:

85% wt of $LiMn_2O_4$

8% wt of acetylene black

4% wt of graphite

3% wt of EPDM (thermoplastic elastomer binder)

The cathode precursor is prepared by blending the components in a highly volatile hydrocarbon solvent until a uniform consistency is achieved.

Anode material: An anode is prepared using a piece of lithium metal of 50 μm in thickness.

Cell assembly: The electrochemical cell is prepared by first coating the suspension of the cathode precursor on a metallic substrate (current collector). The cathode precursor is heat treated to remove any residual trace of solvent and water in order to obtain a dry thickness of approximately 50 μm, corresponding to approximately 1 mAh/cm$^2$ of cathode active material capacity. The electrolyte precursor is then overcoated on the cathode. The thickness of the electrolyte layer is approximately 25 μm. Some of the electrolyte precursor penetrates into the cathode layer. This sub-assembly is exposed to heat (60° C.) for a few minutes in order to initiate polymerization and crosslinking of the molecular complex and comonomers of the electrolyte precursor, thereby yielding a solid polymer electrolyte having intimate contact with the cathode. The lithium metal anode is then laminated to the surface of the polymer electrolyte resulting in an electrochemical cell. This cell will produce an open circuit voltage of 3.8 volts corresponding to the thermodynamic potential value of lithium versus manganese oxide.

Example 9- Preparation of an Ethoxylated Functionalized Cyclodextrin: This example shows the synthesis of an ethoxylated functionalized cyclodextrin, in which the functional group A is an ionic group (lithium succinate ester) and A is linked to the cyclodextrin ring through an ethylene oxide group.

In a typical example, hydroxyethyl α-cyclodextrin (0.1 mole, 123 g. American Maize Products Co.) is dissolved in DMSO (300 ml), and the resulting solution dried over 4Å molecular sieves. The solution is transferred to a clean dry flask. Succinic anhydride (30 g, 0.30 mole, Aldrich Chemical Co.) and about 0.2 g acid-treated Fuller's earth are added to the α-cyclodextrin solution, and the flasks's contents are briefly mixed. The contents of the flask are heated to 70° C. for several hours and then allowed to cool overnight to room temperature. The solution is then filtered and neutralized with lithium hydroxyide (Aldrich Chemical Co.). DMSO and trace water are removed at reduced pressure.

The product is identified as lithium succinoyl ethyl α-cyclodextrin. Confirmation is made by infrared spectroscopy and thin layer chrmatography. The average degree of succination is three; however, succination is expected to occur equally at all available sites.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A method of transporting an ion within an electrolyte composition, comprising the steps of:

providing an electrolyte composition comprising a linear molecule associated with a cyclic molecule, the cyclic molecule comprising a functional group attached thereto, said functional group capable of interacting with an ion, wherein said cyclic molecule is located between a pair of blocking groups of the linear molecule, wherein the cyclic molecule is capable of motion along the length of the linear molecule between the blocking groups;

introducing an ion into the electrolyte composition; and applying a voltage across the electrolyte composition sufficient to cause the ion to migrate, wherein the functional group interacting with the ion moves along the length of the linear molecule in the same direction as the ion and transfers the ion to a functional group of an adjacent cyclic molecule.

2. A method of transporting an ion within an electrolyte composition, comprising the steps of:

providing an electrolyte composition comprising a linear molecule associated with a cyclic molecule, the cyclic molecule having limited mobility in the electrolyte composition, wherein said cyclic molecule is located between a pair of blocking groups of the linear molecule, said blocking groups capable of interacting with an ion, wherein the linear molecule is capable of motion along a length of the linear molecule between the blocking groups;

introducing an ion into the electrolyte composition; and applying a voltage across the electrolyte composition sufficient to cause the ion to migrate, wherein the blocking group interacting with the ion moves along the length of the linear molecule in the same direction as the ion and transfers the ion to a blocking group of an adjacent linear molecule.

* * * * *

UNITED STATES PATENT AND TRADEMARK OFFICE
CERTIFICATE OF CORRECTION

PATENT NO.   : 5,531,871
DATED        : July 2, 1996
INVENTOR(S)  : Fauteux et al.

It is certified that error appears in the above-indentified patent and that said Letters Patent is hereby corrected as shown below:

Col. 1, line 5    After pending. insert -- The invention was made with Government support under contract number 93-F151600-000 awarded by the Central Intelligence Agency --.

Signed and Sealed this

Fifth Day of August, 1997

*Attest:*

BRUCE LEHMAN

*Attesting Officer*    *Commissioner of Patents and Trademarks*